UNITED STATES PATENT OFFICE.

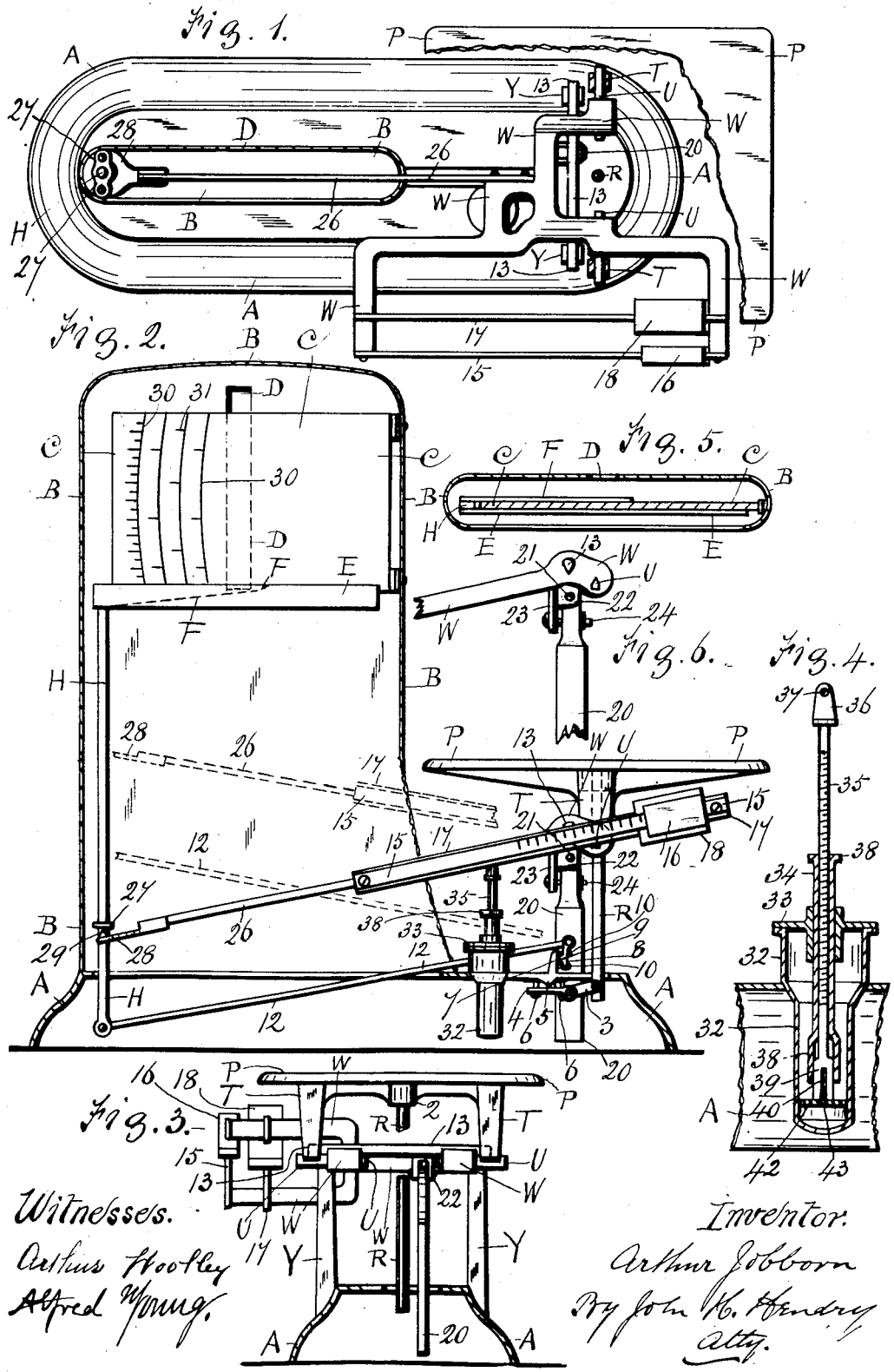

ARTHUR JOBBORN, OF HAMILTON, CANADA, ASSIGNOR TO MOSES JOBBORN, OF HAMILTON, CANADA.

SCALE.

No. 810,539.  Specification of Letters Patent.  Patented Jan. 23, 1906.

Application filed May 3, 1905. Serial No. 258,621.

*To all whom it may concern:*

Be it known that I, ARTHUR JOBBORN, a citizen of Canada, and a resident of Hamilton, in the county of Wentworth and Province of Ontario, Canada, have invented new and useful Improvements in Scales, of which the following is a specification.

My invention relates to automatic computing-scales in which a tare-beam and a multiplying-beam are connected by mechanism to certain hand-indicators which are adapted to automatically rise and fall in level and parallel order in order to indicate various weights and values on a stationary chart of the machine.

The objects of my invention are, first, to provide a scale specially adapted for automatically indicating the weights and values of articles placed on the platter; second, to provide a scale whereby the weighing and computing capacity can be increased; third, to provide a pendulum-scale with a multiplying-beam to increase the capacity and a tare-beam to weigh independently of the computing mechanism; fourth, to provide a scale with an attached dash-pot adapted to check the vibration of the scale and to impart to the scale a steady and even motion, and, fifth, to afford facilities for the proper adjustment of the operating parts. I attain these objects by the mechanism illustrated in the accompanying drawings, in which—

Figure 1 is a plan of my improved scale, the platter or pan part of which is almost broken away and removed to show the operating mechanism underneath said platter. Fig. 2 is an elevation of the same, the lower base part and the housing being in section to show the operating mechanism. Fig. 3 is an end elevation showing the scale part of the machine as viewed from the right-hand end thereof, the central stem being broken. Fig. 4 is an enlarged detail sectional elevation of the dash-pot mechanism of the machine. Fig. 5 is a detail sectional plan of the chart and housing. Fig. 6 is a detail elevation of a part of the lever and pendulum.

Similar letters and numerals refer to similar parts throughout the several views.

In the drawings the stand or base part of the scale is indicated by A and is provided with a certain housing B, which extends upward and contains a computing-chart C, secured in the upper part of said housing. The front part of the housing B is open in order to expose the chart C to view. The rear side of the housing is closed and has a vertical slot D immediately in rear of the middle part of the chart. The housing B also contains a horizontal indicating-arm E, adapted to move vertically and in horizontal line over the face of the chart.

F is a horizontal indicating-arm in rear of the chart and opposite to the front arm E.

The arms E and F are rigidly connected to a vertical stem H in the housing B and which is adapted to be raised and lowered in order that the arm E may indicate weights and values on the face of the chart C and the arm F to indicate weights on the rear side of said chart as viewed through the slot D in the rear of the housing. The face of the chart C is lined and divisioned to indicate values according to weight and price per pound of the load on the platter P and bears suitable lines to be enumerated to indicate weights and prices and is divided into fractional parts of each pound. The rear side of the chart has one column of numerals and divisions similar to the ones on the face of the chart and viewed through the slot D. The segmental lines 30 on the chart C are the same radius as the pivotal centers of the lower rod 12. Any desired number of the lines 30 may be used on the chart C and a suitable number of horizontal lines 31.

The lower part of the housing B is shown broken to indicate that the same may extend in a suitable design to the base A.

P is the platter on which is placed the load to be weighed and has a lower centrally-located hub 2, in which is inserted a vertical stem R, which extends downward and into the base part A. A check-link 3 is pivotally connected to the lower part of the stem R, and the opposite end of the check-link 3 is pivotally connected to a strap 4, which is adjustably connected to the under side of the base A on a V-shaped extension 5 and is capable of being adjusted to said base part by means of set-screws 6 through said strap. The set-screws 6 are adapted to raise or lower the right-hand end of the strap 4, as required. The link 3 and the strap 4 are for the purpose of retaining the vertical stem R in vertical position and the platter P level when loaded and in operation.

T represents spider-bearings, which extend a distance downward from the under side of the platter P. (Shown in Fig. 3 of the drawings.) The bearings T rest on the spider-pivots U, which are in transverse line and carry the platter P. In Fig. 2 of the drawings is seen a stationary lug 7, extending above the top of the base A and near to the right-hand side thereof. An adjustable check-strap 8, having a V-pivot 9, which fits against the lug 7 and held in adjusted position by means of set-screws 10 above and below said pivot 9. The set-screws 10 are adapted to adjust the upper connecting part of the check-strap 8 toward or away from the lug 7. In consequence of the adjustment of the check-strap 8 the rod 12, which is pivotally connected to the upper end of the strap 8, is adjusted. The opposite end of the rod 12 is pivotally connected to the lower end of the vertical stem H.

The scale-lever is indicated by W and is provided with the usual transversely-extending spider-pivot U and fulcrum-pivot 13. The transverse pivot U supports the bearings T of the platter P, and consequently the platter. The transverse pivot 13 rests on and is supported by the columns Y, which extend upward from the base A and are rigid with the base. The two arms or extensions of the lever W, carry the tare-beam 15 and the multiplying-beam 17, both side beams being parallel with each other and secured to the lever W. The tare-poise 16 is adapted to slide on its beam 15, and the multiplying-poise 18 is adapted to slide on its beam 17. The multiplying-poise is used to increase the capacity of the scale in a multiplying form.

20 is the pendulum of the scale and is adapted to swing on the upper pivot 21 of the lugs 22, which form a part of the under side of the lever W. The lug 23, also on the under side of the lever W, carries an adjusting-screw 24 with nut and which passes through the upper part of the pendulum and capable of adjusting the same to the lug 23 in order to bring or adjust the scale to a proper balance. The rod 26 is secured to the lever W and extends to the vertical stem H, which has side extensions 27. The end of the rod 26 has side extensions 28, with cone-pivots 29, which engage the under side of the side extensions of the stem H to raise and lower the same at the same time that the lever W operates on its fulcrum-pivot 13. It will be noticed that the distance between the fulcrum-pivot 13 and the cone-pivots 29 is the same as the distance between the pivotal centers of the lower rod 12. The horizontal and parallel motion of the chart indicators E and F is the result of the coaction and coequal motion of the pivotal rods 12 and 26.

32 is a cylindrical dash-pot conveniently located and secured to the base A and has a cover 33 and a sleeve 34, which is capable of vertical adjustment on the vertical stem 35. The stem 35 and the sleeve 34 are threaded to suit each other to afford said vertical adjustment of the sleeve. The upper end of the stem 35 is in clevis form 36, with hole 37 for pivotal connection with the under part of the lever W and rises and falls with said lever. The upper end 38 of the sleeve 34 is formed as a nut to raise and lower said sleeve on the stem 35. The lower end 38 of the sleeve 34 is increased in size to allow the increased end 39 of the stem 35 to operate therein. The end part 39 of the stem has a through-slot 40, which communicates with the interior of the dash-pot 32, and the lower end of the stem 35 has a circular piston 42, which fits into the dash-pot, and a centrally-located hole 43 through the piston communicates with the slot 40 and with the dash-pot. When the dash-pot is partially filled with oil—that is, the lower parallel part thereof—the enlarged part 38 of the sleeve 34 is adapted to close on the piston and cover the slot-opening 40 or to partially cover said slot, as shown. The dash-pot, together with its connected mechanism, as the stem and the sleeve, checks the vibration of the scale while weighing. The upper enlarged part of the dash-pot affords considerable area for the oil in the lower part to flow into should the scale be carried or be in any wise tilted or roughly handled while weighing. When a load is placed on the platter P, the piston 42 rises. Therefore the oil on the piston, being air-tight, causes a partial vacuum below the piston, thereby causing the scale to move somewhat slower than otherwise, therefore preventing the possibility of the scale going beyond the mark and limit and springing back. In this case the piston when rising displaces the oil under the piston. There is no friction in the scale, as the piston fits loosely in the dash-pot. When the load on the scale is heavy, it is better to close more of the slot 40 than when the load is light. The sleeve 34 may govern the flow of oil through the slot 40 to a very fine degree in order to have the scale operate to a nicety and without friction or vibration.

The operation of the scale is as follows: The scale is balanced, and the load to be weighed is placed on the platter P. It naturally goes downward, and the left-hand part of the lever W beyond its fulcrum-pivot 13 rises, together with the pendulum 20, until the load is balanced. As the pendulum swings out toward the opposite side of the fulcrum the rod 26 lifts the stem H. Consequently the indicating-arms connected to said stem H are also lifted. The stem H rises in vertical line by means of the connected rod 12. Providing the load on the platter P exceeds ten pounds in weight it will be necessary to slide the multiplying-poise 18 on the beam 17 to a certain notch on the beam, according to the load, as the beam will be suitably divided, marked, and notched, similar to the beam 15, as shown, to suit the capacity of the scale. To use the scale without the computing-chart C, it would be necessary to slide the poise 16 along the beam 15 until the scale is balanced. The beam 15 is a common scale-beam suitably marked for pounds and ounces—say to ten pounds. The multiplying-poise 18 is moved on the beam 17, which is suitably marked and notched to enable the user to increase the capacity of the scale and to afford means for indicating the weights and values on the illustrated chart C, as denoted by a number of horizontal divisional lines 31, which extend from the segmental lines 30.

What I claim as my invention, and desire to secure by Letters Patent, is—

1. In a scale, the combination with a vertically-movable stem, of a scale-pan operatively connected to said stem, a double-faced stationary chart, a housing for said chart having one side open and the other side provided with a vertical slit, and horizontal indicating-arms connected to the stem and disposed on opposite sides of the chart for observation through the slit and the open side of the housing.

2. In a scale, a fulcrumed lever, a lug on the lever, a pendulum pivotally connected to the lug and in vertical line with said fulcrum, a secondary lug on the lever at right angles with the first lug and in proximity to the pendulum, and adjusting means connected to the secondary lug and pendulum.

3. In a scale, the combination with a base and a vertically-movable stem, of an indicator operated by said stem, parallel levers pivoted to the stem one above the other and also pivoted to the base, and a scale-pan supported independently of the stem by said parallel levers, whereby the parallel levers operate the indicator.

4. In a scale, the combination with a support or base, of a stem, an indicator operated by said stem, parallel levers pivoted to the base whose pivots are located in vertical alinement with each other, a scale-pan pivoted to one of the levers, a rod connected to the scale-pan, and a link pivoted to the rod in vertical alinement with the point of pivoting the scale-pan to the lever and pivoted to the base in vertical alinement with the point of pivoting the lever to said base.

5. In a scale, the combination with a support or base, of a lever fulcrumed to said base, a scale-pan supported by the lever, a pendulum pivotally connected to the said lever in vertical alinement with the aforesaid fulcrum-point of the lever, and means for adjusting the pendulum laterally to bring the scale to a proper balance.

ARTHUR JOBBORN.

Witnesses:
    JOHN H. HENDRY,
    MOSES JOBBORN.